TIME DELAY DEVICES

Filed June 7, 1955

WITNESSES

Leon J. Taza

K. H. Thomas

INVENTORS
William G. Evans and
Robert A. Ramey
BY
Ezra W. Savage
ATTORNEY

United States Patent Office 2,757,297

Patented July 31, 1956

2,757,297

TIME DELAY DEVICES

William G. Evans, Pittsburgh, and Robert A. Ramey, Library, Pa., assignors to Westinghouse Electric Corporation, East Pittsburgh, Pa., a corporation of Pennsylvania Application June 7, 1955, Serial No. 513,833

4 Claims. (Cl. 307—88)

This invention relates to time delay devices and more particularly to time delay devices of the magnetic type.

In certain control systems, for instance, in those control systems which effect a sequential operation, it is desirable to insert one or more time delay devices. These time delay devices are of various types, for instance, of the magnetic type. If a magnetic type time delay device is utilized some means should be provided to block the voltage induced in the gating circuit of the time delay device when its associated magnetic core member is reset to negative saturation. If such means is not provided this induced voltage or a large percentage of it will appear at the load which is being supplied by the magnetic type time delay device. Loads such as amplifiers are not apt to be designed to block this large voltage, and component failure within the amplifier is possible. Even if component failure does not occur, inaccuracies are introduced into the control system.

The object of this invention is to provide a new and improved time delay device of the magnetic type.

A more specific object of this invention is to provide for blocking, during the reset half-cycle of operation, the voltage induced in the gating circuit of a magnetic type time delay device and for applying substantially all of the supply voltage across the gating winding during that portion of the gating half-cycle of operation when the associated magnetic core member is being driven toward saturation.

Another specific object of this invention is to provide for blocking, during the reset half-cycle of operation, the voltage induced in the gating circuit of a magnetic type time delay device and for applying to the load substantially all of the supply voltage once the associated magnetic core member becomes saturated during the gating half-cycle of operation to thus obtain a maximum of output from the time delay device.

Other objects of this invention will become apparent from the following description when taken in conjunction with the accompanying drawing, in which.

Figure 1:
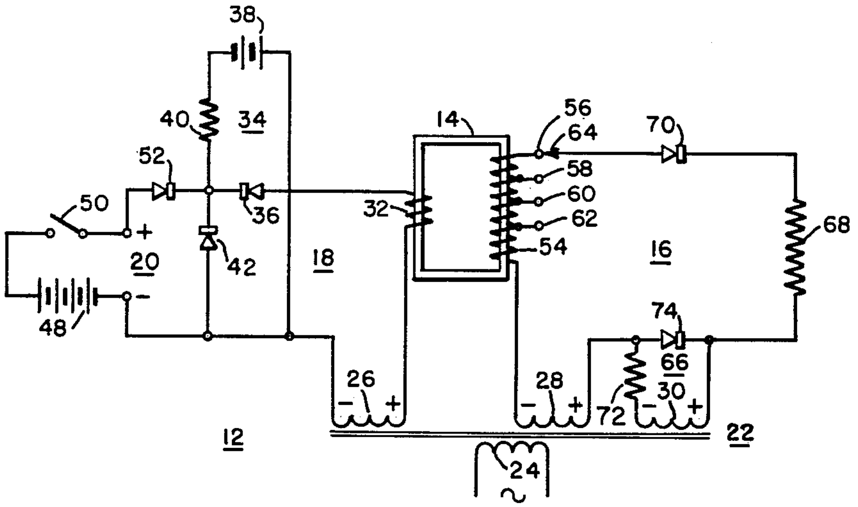
Figure 1 is a schematic diagram of apparatus and circuits illustrating this invention.

Referring to Fig. 1 there is illustrated a magnetic-type time delay device 12 embodying the teachings of this invention. In general, the time delay device 12 comprises a magnetic core member 14, constructed of rectangular-looped core material, a gating circuit 16 for effecting a driving of the magnetic core member 14 toward positive saturation during alternate half-cycles of operation; a reset circuit 18 capable of effecting a driving of the magnetic core member 14 to negative saturation during the other alternate half-cycles of operation; and a control circuit 20 for effecting a direct-current control voltage which prevents the reset circuit 18 from driving the magnetic core member 14 toward negative saturation. The supply voltages for the gating circuit 16 and for the reset circuit 18 are received from a potential transformer 22 having a primary winding 24 and three secondary windings 26, 28 and 30.

The reset circuit 18 comprises a reset winding 32 which is disposed in inductive relationship with the magnetic core member 14 and circuit means for applying substantially all of the voltage across the secondary winding 26, of the transformer 22, to the reset winding 32 during alternate half-cycles of operation provided the control circuit 20 is not applying a direct-current control voltage to the reset circuit 18. In this instance, the circuit means for applying a reset voltage to the reset winding 32 comprises a non-linear device 34 and a blocking rectifier 36, the function of which will be described hereinafter. The non-linear device 34 comprises a series circuit including a source 38 of direct current and an impedance member, specifically a resistor 40, and unilateral conducting means, specifically a rectifier 42, connected in parallel circuit relationship with the series circuit including the source 38 and the impedance member 40, the parallel circuit relationship being with respect to the secondary winding 26. As illustrated, the rectifier 42 is so poled with respect to the source 38 that the source 38 effects a current flow in the forward direction through the rectifier 42.

The non-linear device 34 performs several functions. For instance, when the control circuit 20 is not applying a direct-current control voltage to the reset circuit 18 and when the polarity of the voltage across the secondary winding 26 is as shown in the drawing, the non-linear device 34 effects the application of substantially all of the voltage across the secondary winding 26 to the reset winding 32 so as to drive the magnetic core member 14 to negative saturation. In other words, there is substantially no voltage drop across the non-linear device 34 when the magnetic core member 14 is driven to negative saturation. This can be better understood by referring to Fig. 3 in which a curve 44 represents the external voltage-current characteristic for the non-linear device 34. As can be seen from the curve 44 as long as the exciting current flowing through the reset winding 32 is of lesser magnitude than the current represented at the line 46, there is substantially no voltage drop across the non-linear device 34. Therefore, a voltage of minimum magnitude across the secondary winding 26 of the transformer 22 can effect a driving of the magnetic core member 14 to negative saturation.

Once the magnetic core member 14 has been driven to negative saturation, the current flow through the reset winding 32 tends to increase, however, due to the external voltage-current characteristic of the non-linear device 34 the voltage drop across the non-linear device 34 increases and therefore prevents an excessive current flow through the reset winding 32 and the blocking rectifier 36, or an excessive current drain from the secondary winding 26 of the transformer 22. In other words, the non-linear device 34 acts as a low impedance when the magnetic core member 14 is being driven to negative saturation and acts as a relatively high impedance once the magnetic core 14 has been driven to negative saturation.

In this instance, the control circuit 20 comprises a source of direct-current control voltage 48, a switch 50 for connecting the source 48 in circuit relationship with the reset circuit 18, and a blocking rectifier 52 for preventing the flow of current from the secondary winding 26, of the transformer 22, through the control circuit 20 when the polarity of the voltage across the secondary winding 26 is as shown in the drawing. In operation, if the current flow effected by the control source 48 is of greater magnitude than the current flow through the rectifier 42 as produced by the direct-current source 38 then the non-linear device 34 appears as a high impedance to the source 48 and does not act as a drain on the source 48. However, when the magnetic core member 14 is being driven to negative saturation, the exciting current flowing through the reset winding 32 is of lesser magnitude than the current flowing through the rectifier 32 as produced by the direct-current source 38. This is a necessary condition in order to produce substantially no voltage drop across the non-linear device 34 during this portion of the operation.

As will be explained more fully hereinafter in the description of the operation of the apparatus of Fig. 1, the function of the control circuit 20 is to apply a direct-current control voltage in opposition to the voltage across the secondary winding 26 of the transformer 22 when it is of a polarity as shown in the drawing, to thus prevent the magnetic core member 14 from being driven toward negative saturation. Thus, in practice the direct-current voltage effected by the control source 48 must be of greater magnitude than the magnitude of the voltage across the secondary winding 26, of the transformer 22.

The function of the blocking rectifier 36 is twofold. First, a function of the blocking rectifier 36 is to prevent the flow of current from the control source 48 through the reset winding 32. Second, the blocking rectifier 36 functions to prevent the flow of current through the reset winding 32 when a gating action is taking place and the polarity of the voltage across the secondary winding 26, of the transformer 22, is opposite to that shown in the drawing.

The gating circuit 16 comprises a tapped gating winding 54 and circuit means for applying substantially all of the voltage across the secondary winding 28, of the transformer 22, to the tapped winding 54 when the polarity of the voltage across the secondary winding 28 is opposite to that shown in the drawing. Specifically, the tapped gating winding 54 includes a plurality of stationary contact members 56, 58, 60 and 62 which are electrically connected to taps on the gating winding 54, and a movable contact member 64 which is disposed to be selectively actuated into engagement with the stationary contact members 56, 58, 60 and 62. In practice, the gating winding 54 is so disposed on the magnetic core member 14 that current flow therethrough during the gating half-cycle of operation produces a magnetomotive force that opposes the magnetomotive force produced by the current flow through the reset winding 32 during the reset half-cycle of operation.

Specifically, the circuit means for applying substantially all of the voltage across the secondary winding 28 to the tapped gating winding 54 when the polarity of the voltage across the secondary winding 28 is opposite to that shown in the drawing comprises a non-linear device 66, a load 68, and a blocking rectifier 70 which prevents the flow of current through the gating winding 54 when the polarity of the voltage across secondary winding 28, of the transformer 22, is as shown in the drawing.

The non-linear device 66 comprises a series circuit including the secondary winding 30, of the transformer 22, which functions as a source of alternating voltage, an impedance member 72, and unilateral conducting means, specifically a rectifier 74, connected in parallel circuit relationship with the series circuit including the impedance member 72 and the secondary winding 30, the parallel circuit relationship being with respect to the secondary winding 28. As illustrated, the rectifier 74, the load 68 and the blocking rectifier 70 are connected in series circuit relationship with one another with the rectifier 74 poled oppositely from the blocking rectifier 70.

Figure 3:
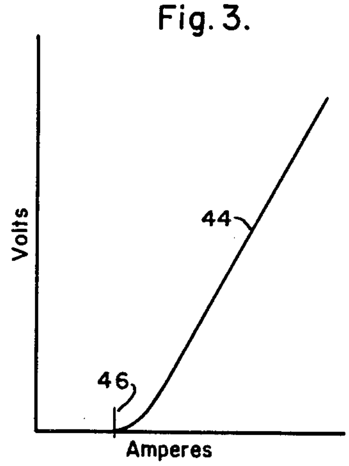
Fig. 3 is a graph illustrating the external voltage-current characteristic of each of the non-linear devices shown in Fig. 1.

The non-linear device 66 also has an external voltage-current characteristic as represented by the curve 44 of Fig. 3. However, in the case of the non-linear device 66 the voltages across the secondary windings 28 and 30 are such that there is substantially no voltage drop across the non-linear device 66 when the magnetic core member 14 is being driven to positive saturation and there is substantially no voltage drop across the non-linear device 66 when the magnetic core member 14 has been driven to positive saturation and a voltage appears across the load 68. In other words, the current flow as effected by the voltage across the secondary winding 28 is always less than the current flow effected by the voltage across the secondary winding 30 of the transformer 22.

When the voltages across the secondary windings 28 and 30 are of opposite polarity from that shown in the drawing, the non-linear device 66 functions to effect an application of substantially all of the voltage across the secondary winding 28 to the tapped gating winding 54 while the magnetic core member 14 is being driven toward positive saturation, and functions during this half-cycle of operation to effect an application of substantially all of the voltage to the load 68 once the magnetic core member 14 has been driven to positive saturation. Therefore, a maximum output is received from the time delay device 12 once the magnetic core member 14 has been driven to positive saturation.

When the polarity of the voltages across the secondary windings 28 and 30 of the transformer 32 are as shown in the drawing, the voltage across the secondary winding 30 effects a voltage across the rectifier 74 of such a polarity as to oppose the voltage induced across the tapped gating winding 54 when the magnetic core member 14 is being driven to negative saturation by the action of the voltage across the secondary winding 26 of the transformer 22. The voltage across the secondary 28 when of opposite polarity to that shown in the drawing likewise opposes the voltage induced across the tapped gating winding 54 when the magnetic core member 14 is being driven to negative saturation by the action of the voltage across the secondary winding 26. In order to block the induced voltage produced across the gating winding 54 when the magnetic core member 14 is being driven to negative saturation, the combined voltage across the secondary winding 28 and the rectifier 74 must be of greater magnitude than the voltage induced across the gating winding 54. If the voltage induced across the gating winding 54 were not blocked, the induced voltage would effect a current flow through the load 68 and thus either produce inaccuracies in the system or damage to the load 68.

Figure 2:
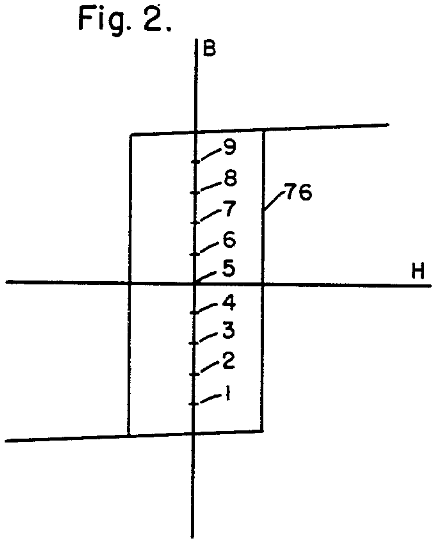
Fig. 2 is a graph illustrating the hysteresis loop for the magnetic core member of Fig. 1.

The operation of the apparatus of Fig. 1 will now be described assuming that the gating winding 54 is designed to support approximately 100 volts before effecting a positive saturation of the magnetic core member 14, that the reset winding 32 is designed to support approximately 10 volts before effecting a negative saturation of the magnetic core member 14, and that a voltage of approximately 10 volts appears across each of the secondary windings 26 and 28 of the transformer 22. Assuming further that the switch 50 is in the open position as shown in the drawing and also assuming the polarity of the voltages across the secondary windings 26, 28 and 30 of the transformer 22 are opposite from that shown in the drawing then current flows from the left end of the secondary winding 28, as shown, through the tapped gating winding 54, the blocking rectifier 70 in the forward direction, the load 68, and the non-linear device 66, to the right end of the secondary winding 28, as shown. Such an action drives the magnetic core member 14 to a level 1 as indicated on its hysteresis loop 76 shown in Fig. 2. During the same half-cycle of operation the blocking rectifier 36 prevents the flow of current through the reset winding 32.

During the next half-cycle of operation, when the polarity of the voltage across the secondary winding 26 of the transformer 22 is as shown in the drawing current flows from the right end of the secondary winding 26, as shown, through the reset winding 32, the blocking rectifier 36, and the non-linear device 34, to the left end of the secondary winding 26, as shown. Such an action drives the magnetic core member 14 to negative saturation. During this latter half-cycle of operation the blocking rectifier 70 prevents the flow of current through the gating winding 54. As long as the switch 50 remains in the open position these latter actions are repeated and no voltage appears across the load 68 except that developed by the exciting current flowing through the tapped gating winding 54.

Assuming the switch 50 is actuated to the closed position then a direct-current control voltage is applied in opposition to the voltage appearing across the secondary winding 26 when it is of a polarity as shown in the drawing. As hereinbefore mentioned, this prevents the magnetic core member 14 from being reset toward negative saturation. Therefore, if the magnetic core member 14 has been driven to a level as indicated at 1 in Fig. 2 during the previous half-cycle of operation, the magnetic core member 14 will not be reset to negative saturation. Then during each alternate half-cycle of operation when the polarity of the voltage across the secondary winding 26 is opposite from that shown in the drawing, the magnetic core member will be driven to a level higher toward positive saturation until finally it goes through all of the levels 1 through 9 and is finally driven to positive saturation. When the magnetic core member 14 has been driven to positive saturation a voltage appears across the load 68 and as hereinbefore mentioned, substantially all the voltage across the secondary winding 28 appears across the load 68.

When the switch 50 is actuated to the open position and the voltage across the secondary winding 26 effects driving of the magnetic core member 14 to negative saturation, the non-linear device 66 and the voltage across the secondary winding 28 function to block the voltage induced across the gating winding 54. Therefore, substantially no voltage appears across the load 68 due to the voltage induced across the gating winding 54 as a result of the magnetic core member 14 being reset to negative saturation. Thus, no inaccuracies are introduced into the system supplied by the time delay device 12 and further no damage is done thereto.

If it is desired to decrease the time delay effected by the time delay device 12, the movable contact member 64 is actuated so as to engage either stationary contact member 58, 60 or 62. For instance, if the movable contact member 64 is actuated into engagement with the stationary contact member 60, the magnetic core member 14 will saturate after approximately six cycles of operation instead of ten as hereinbefore described.

The apparatus embodying the teaching of this invention has several advantages. For instance, substantially no voltage appears across the load 68 when the magnetic core member 14 is being reset to negative saturation. In addition, substantially all of the voltage across the secondary winding 28 appears across the gating winding 54 when the magnetic core member 14 is being driven toward positive saturation. Further, once the magnetic core member 14 has been driven to positive saturation substantially all of the voltage across the secondary winding 28 appears across the load 68. Thus, a maximum of output is obtained from the time delay device 12. It is also to be noted that the time delay device 12 comprises static components and thus requires a minimum of maintenance.

Since numerous changes may be made in the above-described apparatus and circuits, and different embodiments of the invention may be made without departing from the spirit and scope thereof, it is intended that all the matter contained in the foregoing description or shown in the accompanying drawing shall be interpreted as illustrative and not in a limiting sense.

We claim as our invention:

1. In a magnetic type time delay device, the combination comprising, a magnetic core member, a reset winding and a gating winding disposed in inductive relationship with the magnetic core member, circuit means for applying a first voltage to the reset winding during one half-cycle of operation so that the magnetic core member can be driven to negative saturation during said one half-cycle of operation, control means connected to the reset winding for applying a control voltage in opposition to said first voltage so as to prevent the magnetic core member from being driven toward negative saturation, and other circuit means including a non-linear device for applying a second voltage to the gating winding during the next half-cycle of operation so as to drive the magnetic core member toward positive saturation, the non-linear device having a source of alternating voltage for effecting a voltage in opposition to the voltage induced across the gating winding when the magnetic core member is being driven to negative saturation and the non-linear device being such that when the magnetic core member is being driven to positive saturation there is substantially no voltage drop across the non-linear device and substantially all of said second voltage is applied across the gating winding.

2. In a magnetic type time delay device, the combination comprising, a magnetic core member, a reset winding and a gating winding disposed in inductive relationship with the magnetic core member, circuit means for applying a first voltage to the reset winding during one half-cycle of operation so that the magnetic core member can be driven to negative saturation during said one half-cycle of operation, control means connected to the reset winding for applying a control voltage in opposition to said first voltage so as to prevent the magnetic core member from being driven toward negative saturation, a non-linear device including a series circuit including a source of alternating voltage and an impedance member, and unilateral conducting means connected in parallel circuit relationship with said series circuit, and a series circuit including the unilateral conducting means, and a blocking rectifier for applying a second voltage across the gating winding during the next half-cycle of operation so that during said next half-cycle of operation the magnetic core member is driven toward positive saturation, the blocking rectifier and the unilateral conducting means being poled oppositely and said source of alternating voltage being such as to effect a voltage in opposition to the voltage induced across the gating winding when the magnetic core member is being driven to negative saturation.

3. In a magnetic type time delay device, the combination comprising, a magnetic core member, a reset winding and a gating winding disposed in inductive relationship with the magnetic core member, a potential transformer having a primary winding and at least two secondary windings, circuit means for applying substantially all of the voltage across one of the secondary windings to the reset winding during one half-cycle of operation so that the magnetic core member can be driven to negative saturation during said one half-cycle of operation, control means connected to the reset winding for applying a control voltage in opposition to said voltage across said one of the secondary windings so as to prevent the magnetic core member from being driven toward negative saturation, a non-linear device including a series circuit including a source of alternating voltage and an impedance member, and unilateral conducting means connected in parallel circuit relationship with said series circuit, and a series circuit including the unilateral conducting means and a blocking rectifier for applying substantially all of the voltage across the other of the secondary windings to the gating winding during the next half-cycle of operation so that during said next half-cycle of operation the magnetic core member is driven toward positive saturation, the blocking rectifier and the unilateral conducting means being poled oppositely and said source of alternating voltage being such as to effect a voltage in opposition to the voltage induced across the gating winding when the magnetic core member is being driven to negative saturation.

4. In a magnetic type time delay device, the combination comprising, a magnetic core member, a reset winding and a tapped gating winding disposed in inductive relationship with the magnetic core member, a potential transformer having a primary winding and at least three secondary windings, circuit means for applying substantially all of the voltage across one of the secondary windings to the reset winding during one half-cycle of operation so that the magnetic core member can be driven to negative saturation during said one half-cycle of operation, control means connected to the reset winding for applying a direct-current control voltage in opposition to said voltage across said one of the secondary windings so as to prevent the magnetic core member from being driven toward negative saturation, a non-linear device including a series circuit including another of said secondary windings and an impedance member, and unilateral conducting means connected in parrallel circuit relationship with said series circuit, and a series circuit including the unilateral conducting means and a blocking rectifier for applying substantially all of the voltage across the remaining secondary winding to the gating winding during the next half-cycle of operation so that during said next half-cycle of operation the magnetic core member is driven toward positive saturation, the blocking rectifier and the unilateral conducting means being poled oppositely and the voltage across said another of said secondary windings being such as to effect a voltage in opposition to the voltage induced across the gating winding when the magnetic core member is being driven to negative saturation.

No references cited.